(12) United States Patent
Forsythe et al.

(10) Patent No.: US 6,719,000 B1
(45) Date of Patent: Apr. 13, 2004

(54) TWO STAGE FUEL TANK VENT VALVE

(75) Inventors: Alan K. Forsythe, Kent, WA (US); Scott F. Coomes, Seattle, WA (US)

(73) Assignee: G. T. Development Corporation, Seattle, WA (US)

( * ) Notice: Subject to any disclaimer, the term of this patent is extended or adjusted under 35 U.S.C. 154(b) by 0 days.

(21) Appl. No.: 10/068,548

(22) Filed: Feb. 5, 2002

Related U.S. Application Data

(60) Provisional application No. 60/266,669, filed on Feb. 5, 2001.

(51) Int. Cl.[7] .............................................. F16K 24/04
(52) U.S. Cl. .......................................... 137/202; 137/43
(58) Field of Search .................................. 137/43, 202

(56) References Cited

U.S. PATENT DOCUMENTS

| | | | | |
|---|---|---|---|---|
| 5,386,843 A | * | 2/1995 | Church ........................ 137/202 |
| 5,439,023 A | * | 8/1995 | Horikawa ..................... 137/202 |
| 6,085,771 A | * | 7/2000 | Benjey et al. ............... 137/202 |

* cited by examiner

*Primary Examiner*—Gerald A. Michalsky
(74) *Attorney, Agent, or Firm*—Christensen O'Connor Johnson Kindness PLLC

(57) ABSTRACT

A two-stage vent valve 10 is incorporated into a vehicle fuel distribution system. The vent valve 10 is mounted to the top of a fuel tank of a motor vehicle in a vertically orientated position, so that a fluid inlet is in communication with the interior open air volume of the fuel tank, and an outlet is in communication with the exterior of the tank. The vent valve 10 utilizes a two-stage valve mechanism to allow vapor to escape from the fuel tank, while preventing the leakage of liquid fuel during such operating conditions where the vehicle has tilted due to a small downgrade, sloshing of fuel in a full or near-full tank, or the event of a roll-over.

15 Claims, 4 Drawing Sheets

TWO STAGE FUEL TANK VENT VALVE

CROSS-REFERENCES TO RELATED APPLICATIONS

This application claims the benefit from U.S. Provisional Application No. 60/266,669, filed on Feb. 5, 2001, the disclosure of which is incorporated herein by reference.

FIELD OF THE INVENTION

The present invention relates to valves, and more particularly, to fuel tank vent valves.

BACKGROUND OF THE INVENTION

Fuel tank "vent valves" are commonly incorporated in vehicle fuel systems for the purposes of allowing air to displace the fuel as it is consumed, and for releasing vapor or gaseous pressure buildup in the fuel tank. The main objective for most vent valves is to allow the flow of gases in or out of the tank, while preventing any liquid fuel from escaping, regardless of the angle of orientation of the vehicle. Venting is commonly required because vapor is returned to the fuel tank from many types of engines during operation, and this vapor must be vented to avoid pressurizing the tank. This vapor must be conducted through a vapor outlet in the vent. Thus, vent valves must be designed to close their vapor outlets during certain operating conditions, such as vehicle tilting, sloshing of fuel when the tank is full or near-full, or roll-over of the vehicle, in order to prevent spillage of liquid fuel through the vapor outlet.

Presently known vent valves close the vapor outlet through the use of a float. If the vent Valve were to close due to a condition, such as sloshing in the tank, there is a commonly encountered problem in reopening the closed vent valve because the vapor from the engine creates pressure within the fuel system which applies forces against the seat which in turn must be overcome to reopen the vent valve. In this particular situation, the pressure in the fuel tank exerts enough force over the area of the valve outlet that the vent valve cannot easily reopen upon the return of the vehicle to normal operating conditions. As a result, most vent valves are designed to have a small sized vapor outlet so that the forces applied by the fuel vapor pressure against the small area of the outlet can then be easily overcome by the proper sizing and weighting of the float.

However, in fuel systems where high vapor flow rates are required, a vent valve having a small vapor outlet is inadequate to fully relieve the pressure. Therefore, these vent valves are: designed with a larger vapor outlet to provide for adequate flow rates for fuel systems with high gaseous return flow from the engine. However, this compromises the ability of the float to re-open the vapor outlet if it closes for any reason and the tank subsequently pressurizes. Thus, there is a need in the fuel distribution system industry for a vent valve to have a sufficiently large vapor outlet to provide adequate discharge flow rates, while still being able to reopen the vent valve during tank pressurized conditions.

SUMMARY OF THE INVENTION

In accordance with aspects of the present invention, a vent valve includes a valve body defining an inner cavity and having an inlet for admitting a fluid or a gas into the cavity and an outlet port for discharging the fluid or the gas from the cavity to the exterior of the valve body. The vent valve also includes a main vapor outlet disposed in the valve body and in fluid communication with the outlet port and the inlet. A valve mechanism is provided and is positioned within the inner cavity. The valve mechanism is movable between a first position, wherein the main vapor outlet is closed, and a second position, wherein the main vapor outlet is open.

In accordance with one aspect of the present invention, the valve mechanism of the vent valve includes a valve member or poppet having a seating surface for mating with the main vapor outlet in a leak-proof manner. The poppet has a longitudinal bore extending therethrough and is disposed in fluid communication with the main vapor outlet, thereby defining an auxiliary vapor outlet. The auxiliary vapor outlet has a smaller cross-sectional area than the main vapor outlet. The valve mechanism also includes a buoyancy member having a seating surface for mating with the auxiliary vapor outlet in a leak-proof manner, and a poppet retaining member supported by a portion of the buoyancy member. The retaining member is operable to retain the poppet in a slidably engageable manner. The retaining member has a slot in communication with the inner cavity and the auxiliary vapor outlet. The buoyancy member is operable to translate relative to the poppet from a first auxiliary vapor outlet closed position, wherein the surface of the buoyancy member is seated into the auxiliary vapor outlet, to an auxiliary outlet opening position, wherein the seating surface of the buoyancy member unseats from the auxiliary vapor outlet.

In accordance with another embodiment of the present invention, the vent valve includes a cup seat biased into sealing engagement with an interior portion of the valve body. The cup seat includes a main vapor outlet in fluid communication with the outlet port and the inlet.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

The present invention will now be described with reference to the accompanying drawings where like numerals correspond to like elements. One exemplary embodiment of a two-stage vent valve, generally designated 10, formed in accordance with the present invention is illustrated in FIGS. 1–4. Generally described, the two-stage vent valve 10 (herein after "the vent valve 10") is incorporated into a vehicle fuel distribution system. The vent valve 10 is mounted to the top of a fuel tank (not shown) of a motor vehicle in a vertically orientated position, so that a fluid inlet is in communication with the interior open air volume of the fuel tank, and an outlet is in communication with the exterior of the tank. The vent valve 10 utilizes a two-stage valve mechanism to allow vapor to escape from the fuel tank, while preventing the leakage of liquid fuel during such operating conditions where the vehicle has tilted due to a small downgrade, sloshing of fuel in a full or near-full tank, or the event of a roll-over.

Although the vent valve 10 is described herein as being coupled to the fuel tank of a fuel distribution system, it is to be understood that the vent valve 10 can be incorporated in other fluid distribution systems requiring or desiring gas venting capabilities while preventing the discharge of liquid. Thus, the following description relating to fuel distribution systems is meant to be illustrative and not limiting to the broadest scope of the inventions, as claimed.

Figure 1:
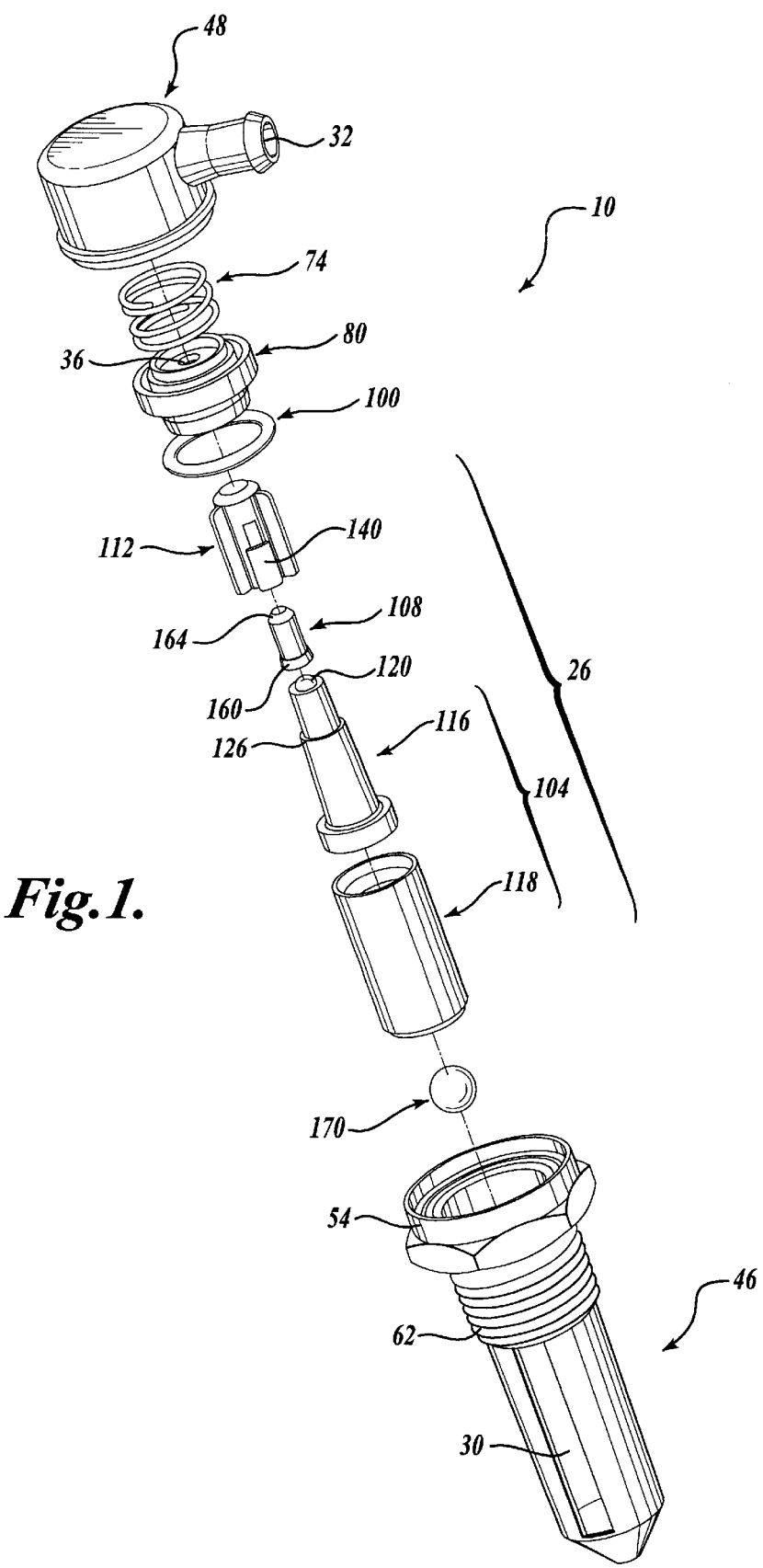
FIG. 1 is an exploded perspective view of a two-stage vent valve formed in accordance with the present invention.
Figure 2:
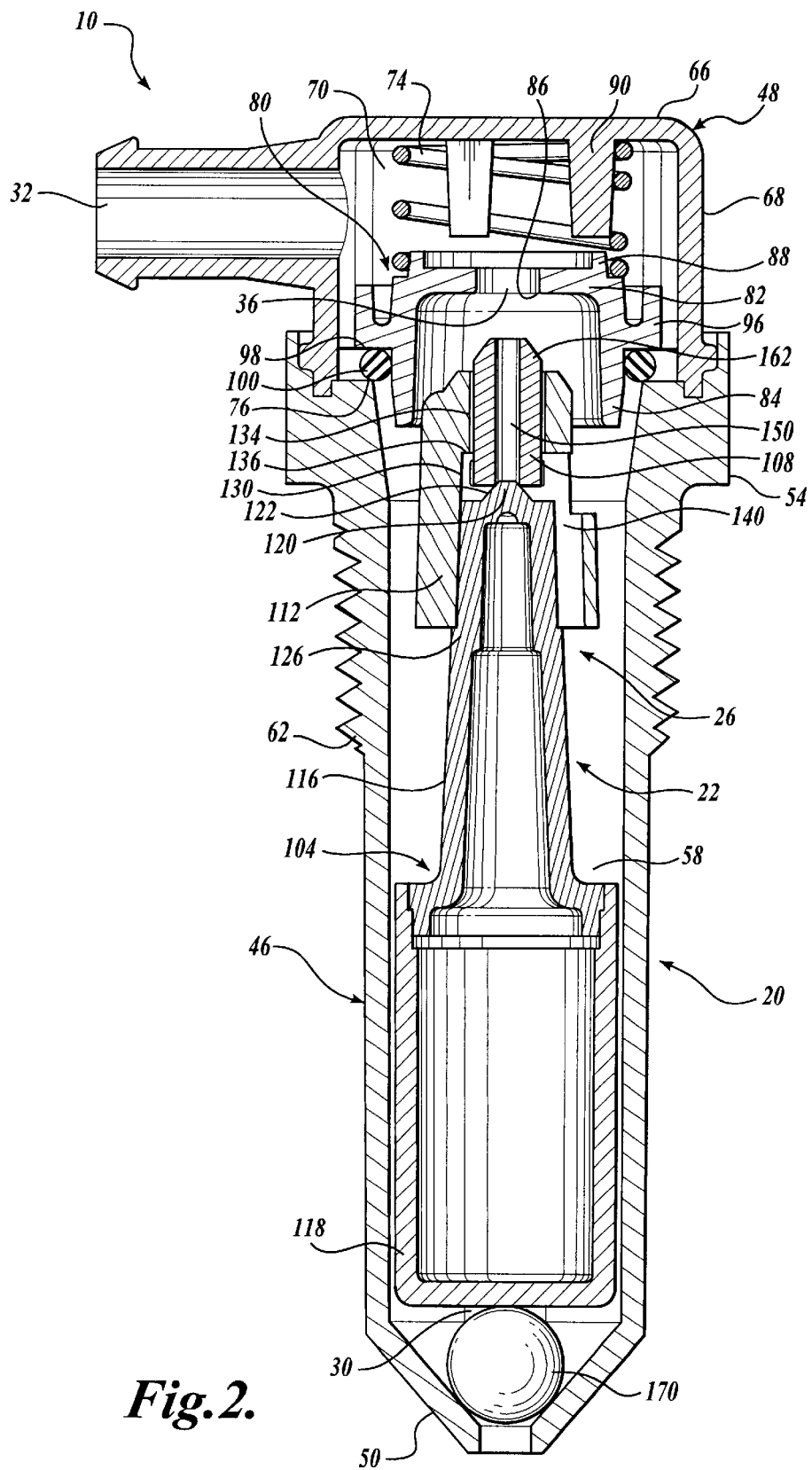
FIG. 2 is a longitudinal cross-section view of the vent valve of FIG. 1 in the open position.

Referring now to FIG. 2, the vent valve 10 includes a valve body 20 that defines an inner cavity 22, and a two-stage valve mechanism 26 (herein after "valve mechanism 26") translatably retained by the valve body 20 within the inner cavity 22. The vent valve 10 includes an inlet 30 for receiving vapor into the inner cavity 22 from the fuel tank of a fuel distribution system, and an outlet port 32 for discharging vapor from the inner cavity 22 to the exterior of the tank. Disposed in the valve body 20 is a main vapor outlet 36 in communication with the outlet port 32 and the inlet 30. The valve mechanism 26 seats within the main vapor outlet 36 under certain operating conditions, as mentioned above, to prevent vapor and fuel from exiting the outlet port 32. When normal operating conditions (i.e. little or no fluid present in the inner cavity, and the pressure difference between the outlet port and the inlet is approximately zero) return to the vent valve 10, the valve mechanism 26 unseats from the main vapor outlet 36, thereby allowing fuel vapor to pass through the main vapor outlet 36 and exit the outlet port 32. However, in some instances which cause fuel to enter the inner cavity 22, such as sloshing, a flow of vapor into the tank is present, which pressurizes the tank. In this state, the force of the pressurized vapor within the tank prevents the valve mechanism 26 from unseating from the main vapor outlet 36. Thus, to reopen the vent valve 10, as will be described in more detail below, the valve mechanism 26 opens an auxiliary vapor outlet 40 (shown in FIGS. 3 and 4), which allows fuel vapor to be discharged through the outlet port 32, thereby returning the interior pressure of the vent valve 10 back to normal operating conditions.

The valve body 20 is comprised of a generally cylindrical shaped lower portion 46 and a vent cap 48. The lower portion 46 is formed with a conical tip 50 at one end and a longitudinally extending flange 54 at its opposite end for connection with the vent cap 48. The lower portion 46 defines a lower section 58 of the inner cavity 22 for translatably receiving the valve mechanism 26 therein, as will be described in more detail below. The section 58 extends from the conical tip 50 to the main vapor outlet 36. The lower portion 46 includes the inlets 30 for providing fluid communication between the lower section 58 of the inner cavity 22 and the exterior of the body 12. In the embodiment shown, the inlets 30 are longitudinally disposed slots; however, any type of inlet that allows vapor to enter into the lower section 58, such as circular apertures, may be used. The lower portion 46 includes a section of external threads 62, which extend around the peripheral circumference of the lower portion 46 adjacent to the flange 54. The lower portion 46 is coupled to the upper surface of the fuel tank by the external threads 62 in a sealing fashion so that the lower portion 46 extends into the open-air volume of the fuel tank. It will be appreciated that the lower portion 46 may have other cross-sectional geometries, such as rectangular, and may be sealingly coupled to the fuel tank by other leak proof methods known in the art.

With continued reference to FIG. 2, the vent cap 48 is generally cylindrical and includes a top wall 66 and downward depending side walls 68 that define an upper section 70 of the inner cavity 22. The vent cap 48 includes the outlet port 32, which is in communication with the upper section 70 of the inner cavity 22. The outlet port 32 may be formed as a hose fitting, as shown. The vent cap 48 is fixedly secured to the flange 54 of the lower portion 46 by methods know in the art, such as crimping, in a manner that permits rotation to align outlet port 32 in any desired direction after the vent valve is installed in the tank. Located within the upper section 70 of the inner cavity 22 and biased via a biasing member 74 into sealing engagement with an inner peripheral shoulder 76 of the lower portion 46 is cup seat 80. The cup seat 80 is an open ended cylindrical body formed by a top wall 82 and downward depending side skirt 84. Centrally located in the top wall 82 and extending through the top wall 82 is the main vapor outlet 36 defining a main valve seat 86. The top wall 82 may include an outwardly extending lip 88 spaced inwardly from the peripheral outer edge of the top wall 82 for retaining one end of the biasing member 74. The vent cap 48 may include corresponding posts or stops 90 that extend inwardly into the upper sections 70 of the inner cavity 22 for retaining the other end of the biasing member 74. An outwardly extending flange 96 is located about the peripheral circumference of the cup seat 80, thereby forming a shoulder 98. Thus, the biasing member 74 forces the cup seat shoulder 98 into sealing engagement with the inner peripheral shoulder 76 of the lower portion 46, thereby restricting fluid communication between the upper and lower sections 70 and 58 of the inner cavity 22 to the main vapor outlet 36.

In the embodiment shown, a ring seal 100 is disposed between the cup seat shoulder 98 and the inner peripheral shoulder 76 of the lower portion 46 thereby creating a leak-proof connection. It will be appreciated that the biased cup seat functions as a pressure relief valve. Thus, the biasing force of the biasing member may be pre-selected to release at a predetermined maximum interior pressure exerted against the cup seat.

Positioned within the lower section 58 of the inner cavity 22 and translatable therein is the valve mechanism 26. The valve mechanism 26 includes a buoyancy member or float 104, a poppet 108, and a poppet retaining member 112. The float 104 is formed from upper and lower hollow sections 116 and 118 that are sealingly joined or welded to form a hollow floatation device. The lower float section 118 is suitably dimensioned in cross-section to allow for easy translational movement within the inner cavity 22, while allowing liquid fuel to occupy space between the outer wall of the lower float section 118 and the inner wall of the lower portion 46. The upper float section 116 includes a small cone section 120 that defines an auxiliary valve face 122. The cone section extends outwardly from the vent cup facing surface of the upper float section 116. The cone section 120 is sized to be received within the auxiliary vapor outlet 40 (FIGS. 3 and 4) of the poppet 108 in sealing engagement, as will be described in more detail below. A stepped-up portion or shoulder 126 is formed about the peripheral circumference of the float 104, spaced remote from the cone section 120. The shoulder 126 supports the poppet retaining member 112, as will be described in more detail below.

The poppet retaining member 112 is generally cylindrical with a longitudinally extending bore 130. The bore 130 has a diameter suitable for receiving the upper float section 116 in a friction fit manner. When the poppet-retaining member 112 is secured to the float 104, the bottom edge of the poppet retaining member 112 rests on the float shoulder 126. The bore 130 includes an upper section 134 having a smaller diameter than the remaining bore section. The upper bore section 134 forms an inner shoulder portion 136. The upper bore section 134 is sized to receive the poppet 108 in sliding engagement. The poppet retaining member 112 further includes one or more longitudinally extending slots 140 for permitting fuel vapor to enter into the bore 130.

The poppet 108 is a cylindrical member having a longitudinally extending bore 150 therethrough. The lower end of the bore 150 creates the auxiliary vapor outlet 40, which defines an auxiliary valve seat 156. The bore 130 is sized to receive the valve face 122 of the cone section 120 in seating engagement with the valve seat 156 of the auxiliary vapor outlet 40. The auxiliary vapor outlet 40 is dimensioned smaller than the main vapor outlet 36. Formed around the lower peripheral circumference of the poppet 108 is a flange 160. The flange 160 is sized to engage against the inner shoulder 136 of the poppet retaining member 112. Thus, the flange 160 prevents the poppet 108 from uncoupling from the poppet retaining member 112 when the poppet retaining member 112 moves in a downward direction. The top of the poppet 108 includes a conical shaped valve face 164 for sealing engagement with the valve seat 86 of the main vapor outlet 36.

The operation of the vent valve 10 will now be described with reference to FIGS. 2–4. FIG. 2 is a longitudinal cross-section view of the vent valve 10 in the open position. Under normal operating conditions, the vent valve 10 is in an upright or vertical orientation with the valve mechanism 26 positioned in its downward most orientation, resting on a ball 170 enclosed with the conical tip 50 of the lower portion 46. In this position, the valve face 164 of the poppet 108 is unseated from the valve seat 86 of the main vapor outlet 36. Thus, the main vapor outlet 36 is unseated or opened such that vapor returning to the tank from the engine can enter the valve body 20 through inlets 30, pass upwardly past the valve mechanism 26, and freely exit through the main vapor outlet 36. Once through the main vapor outlet 36, the fuel vapor is then discharged by the outlet port 32. It will be appreciated that the inlets 30 in the lower portion 46 of the body 20 are sufficiently large to minimize obstruction to such flow, and the poppet retaining member 112 is designed to cause minimal obstruction to the free flowing vapor when the vent valve 10 is upright and open.

Figure 3:
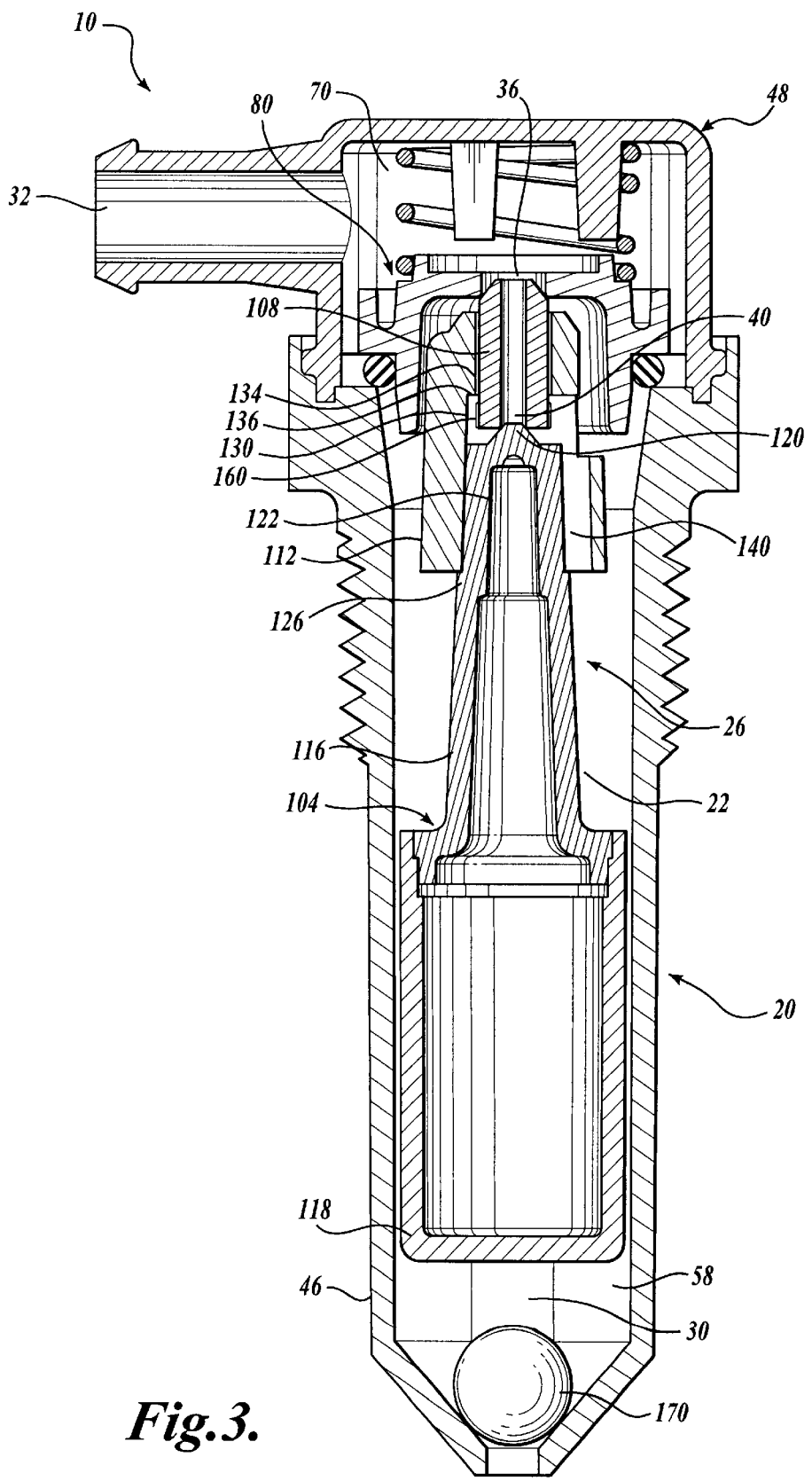
FIG. 3 is a longitudinal cross-section view of the vent valve of FIG. 1 in the closed position.
Figure 4:
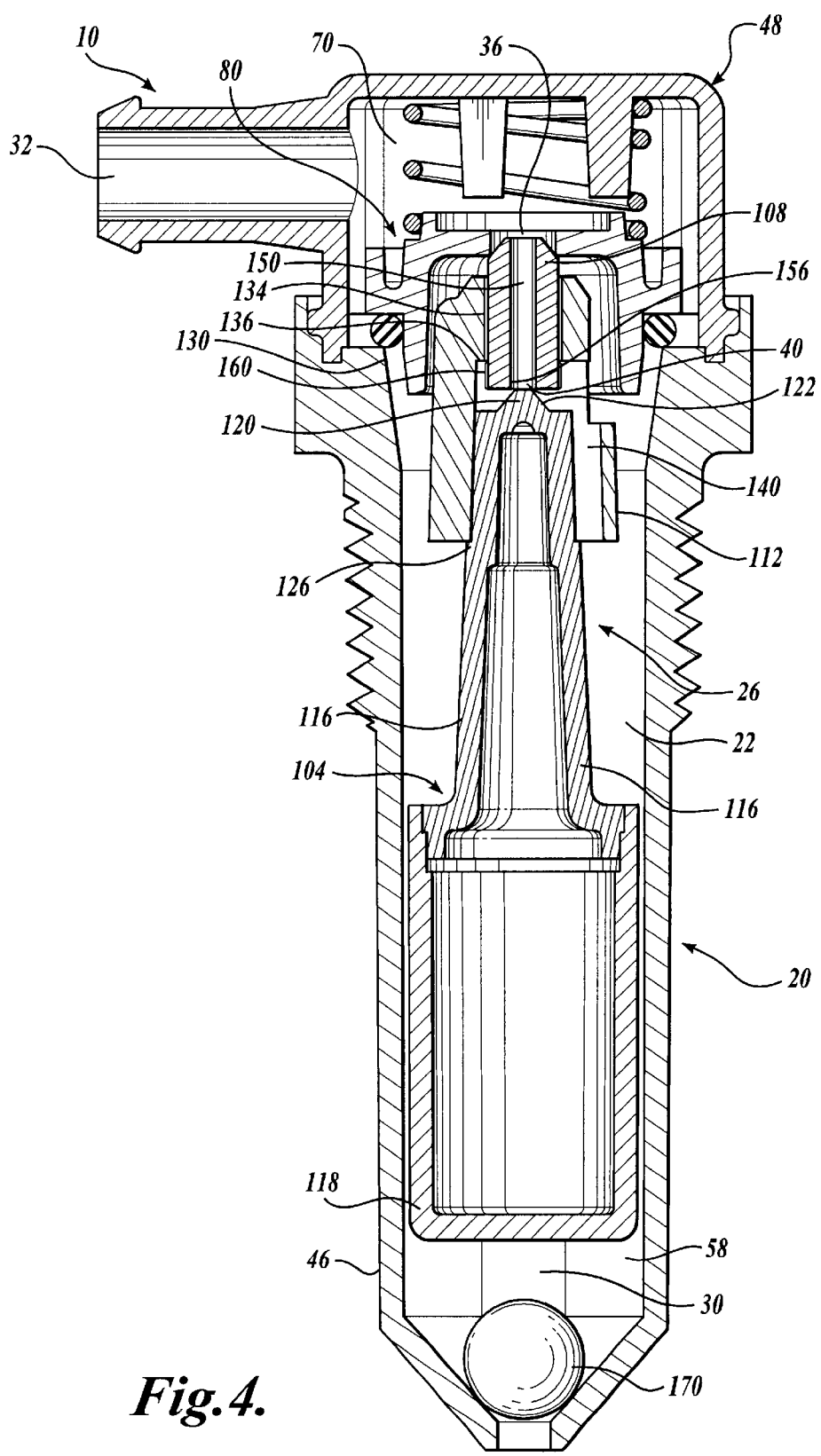
FIG. 4 is a longitudinal cross-section view of the vent valve of FIG. 1 with the float in an intermediate position, wherein the auxiliary vapor outlet is open, but the main vapor outlet is closed.

In a condition where fuel enters the lower section 58 of the inner cavity 22, such as sloshing or titling of the vehicle, the valve mechanism 26 rises within the inner cavity 22 due to the buoyancy of the float 104 from the main vapor outlet open position shown in FIG. 2 to the main vapor outlet close position shown best in FIG. 3. The valve mechanism 26 rises carrying with it the poppet 108. The valve face 122 of the cone section 120 is engaged with the valve seat 156 of the auxiliary vapor outlet 40. This seals the auxiliary vapor outlet 40. At the same time, the float rises until the valve face 164 of the poppet 108 seats within the valve seat 86 of the main vapor outlet 36. Once the main vapor outlet 36 and the auxiliary vapor outlet 40 are sealed, preventing vapor and fuel from passing through the valve body 20 and exiting through the outlet port 32, the vent valve 10 is in the closed position shown best in FIG. 3.

Upon returning to normal operating conditions, the valve mechanism 26 drops to its original, main vapor outlet opening position shown in FIG. 2, thereby unseating the valve face 164 of the poppet 108 from the valve seat 86 of the main vapor outlet 36.

Under certain circumstances where there may have been considerable flow of vapor into the tank when the vent valve 10 was in the main vapor closing position, normal operating conditions within the tank are not present. In this situation, the interior pressure of the lower section 58 of the inner cavity 22 exerts a force against the main vapor outlet equal to the tank pressure multiplied by the main vapor outlet area, which is greater than the force exerted by the normal atmospheric pressure present in the upper section 70 of the inner cavity 22 in combination with the weight of the valve mechanism 26. Accordingly, the valve mechanism 26 is retained in the closed and seated position shown best in FIG. 3. Since the downward force required to unseat the auxiliary vapor outlet 40 (to overcome the upward force exerted on the auxiliary vapor outlet by the pressure in the tank) is lower due to the smaller diameter of the auxiliary vapor outlet 40, the weight of the combined float 104 and the retaining member 112 act against the force exerted on the auxiliary vapor outlet 40. Accordingly, the float 104 is designed to have sufficient weight to counteract the forces exerted against the auxiliary vapor outlet 40, and the float 104 and the retaining member 112 translate downward until the retaining member 112 rests on the flange 160 of the poppet 108, as shown best in FIG. 4. As the float 104 translates downwardly separating from the poppet 108, the valve face 122 of the cone section 120 unseats from the valve seat 156 of the auxiliary main vapor outlet 40.

Once the auxiliary vapor outlet 40 is open, vapor is able to pass from the lower section 58 of the inner cavity 22 through the slot 140 of the retaining member 112 and up through the bore 150 of the poppet 108. Thus, the vent valve 10 is able to vent a portion of the vapor present in the tank through the auxiliary vapor outlet 40, and out of the outlet port 32. When the pressure in the tank has declined sufficiently so that the weight of the float 104 can separate the poppet 108 from the main vapor outlet 36, the main vapor outlet 36 has achieved its open position shown in FIG. 2. In this state, the vapor present in the tank may then be vented out of the outlet port 32 as required.

According to aspects of the present invention, the two stage valve mechanism 26 enables the vent valve 10 to equalize the pressure within the tank to atmosphere even when pressure in the tank has been elevated due to temporary closure of the main vapor outlet and subsequent substantial injection of vapor into the tank from the engine.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A vent valve for use in a vehicle fuel system comprising:
   a valve body defining an inner cavity and having an inlet for admitting a fluid or a gas into said cavity and an outlet port for discharging said fluid or said gas from said cavity to the exterior of said valve body;
   a main vapor outlet disposed in said valve body and in fluid communication with said outlet port and said inlet; and
   a valve mechanism positioned within said inner cavity and movable between a first position, wherein said main vapor outlet is closed, and a second position, wherein said main vapor outlet is open, said valve mechanism including:
      a poppet having a seating surface for mating with said main vapor outlet in a leak-proof manner, said poppet having a longitudinal bore extending therethrough in fluid communication with said main vapor outlet, thereby defining an auxiliary vapor outlet, said auxiliary vapor outlet having a smaller cross-sectional area than said main vapor outlet;

a buoyancy member having a seating surface for mating with said auxiliary vapor outlet in a leak-proof manner, and a poppet retaining member supported by a portion of said buoyancy member, said retaining member operable to retain said poppet in a slideably engageable manner, said retaining member having at least one slot in communication with said inner cavity and said auxiliary vapor outlet; wherein said buoyancy member is operable to translate relative to said poppet from a first auxiliary vapor outlet closed position, wherein said seating surface of said buoyancy member is seated into said auxiliary vapor outlet, to an auxiliary outlet opening position, wherein said seating surface of said buoyancy member unseats from said auxiliary vapor outlet wherein said valve body is comprised of a lower portion and a vent cap, wherein said vent cap is coupled to said lower portion and adapted to swivel about said lower portion.

2. The vent valve of claim 1 wherein said outlet port is positioned in said vent cap, said vent cap adapted to swivel about said lower portion so as to change the position of the outlet port with respect to the lower portion.

3. The vent valve of claim 1, further including a cup seat biased into sealing engagement with an interior portion of said lower portion of said valve body.

4. The vent valve of claim 3, wherein said main vapor outlet is disposed in said cup seat.

5. The vent valve of claim 4, wherein said cup seat is operable as a pressure relief valve.

6. The vent valve of claim 1, wherein said retaining member includes a bore extending therethough, said bore having a first section for receiving said poppet in sliding engagement, and a second section for receiving said buoyancy member in friction fit engagement.

7. The vent valve of claim 1, wherein said retaining member includes an internal shoulder and wherein said poppet includes an external shoulder such that relative motion is limited wherein the weight of said buoyancy member hangs on said poppet when said shoulders engage.

8. The vent valve of claim 1, where said valve mechanism is movable between said first position and said second position when liquid is present in said lower portion of said valve body.

9. A vent valve comprising:

a valve body defining an inner cavity and having an inlet for admitting a fluid into said cavity and an outlet port for discharging said fluid from said cavity to the exterior of said valve body;

a cup seat biased into sealing engagement with an interior portion of said valve body, said cup seat including a main vapor outlet in fluid communication with said outlet port and said inlet; and a valve mechanism positioned within said inner cavity and movable between a main vapor outlet closing position, wherein said main vapor outlet is closed, and main vapor outlet opening position, wherein said main vapor outlet is open, said valve mechanism including:

a poppet having a seating surface for mating with said main vapor outlet in a leak-proof manner, said poppet having a longitudinal bore extending therethrough in fluid communication with said main vapor outlet, thereby defining an auxiliary vapor outlet, said auxiliary vapor outlet having a smaller cross-sectional area than said main vapor outlet, a float member having a seating surface for mating with said auxiliary vapor outlet in a leak-proof manner, and a poppet retaining member supported by a portion of said float member, said retaining member operable to retain said poppet in a slideably engageable manner, said retaining member having at least one slot in communication with said inner cavity and said auxiliary vapor outlet; wherein said float member is operable to translate relative to said poppet from a first auxiliary vapor outlet closed position, wherein said seating surface of said float is seated into said auxiliary vapor outlet in a leak-proof manner, to a auxiliary outlet opening position, wherein said seating surface of said float unseats from said auxiliary vapor outlet.

10. The vent valve of claim 9, wherein said valve body is comprised of a lower portion and a vent cap, said cup seat biased away from an inner portion of said vent cap.

11. The vent valve of claim 10, wherein said cup seat is operable as a pressure relief valve.

12. The vent valve of claim 10, wherein said vent cap is coupled to said lower portion and adapted to swivel about said lower portion.

13. The vent valve of claim 12, wherein said outlet port is positioned in said vent cap, said vent cap adapted to swivel about said lower portion so as to change the position of the outlet port with respect to the lower portion.

14. The vent valve of claim 9, wherein said retaining member includes a bore extending therethough, said bore having a first section for receiving said poppet in sliding engagement, and a second section for receiving said float member in friction fit engagement.

15. The vent valve of claim 9, wherein said retaining member includes an internal shoulder and wherein said poppet includes an external shoulder wherein relative motion is limited such that the weight of said buoyancy member hangs on said poppet when said shoulders engage.

* * * * *